United States Patent
Shinoda

(10) Patent No.: US 8,551,901 B2
(45) Date of Patent: Oct. 8, 2013

(54) CATALYST FOR PURIFYING NITROGEN OXIDE

(75) Inventor: Kiyoshi Shinoda, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 323 days.

(21) Appl. No.: 12/991,519

(22) PCT Filed: Nov. 6, 2008

(86) PCT No.: PCT/JP2008/070172
§ 371 (c)(1),
(2), (4) Date: Nov. 8, 2010

(87) PCT Pub. No.: WO2009/139088
PCT Pub. Date: Nov. 19, 2009

(65) Prior Publication Data
US 2011/0065568 A1    Mar. 17, 2011

(30) Foreign Application Priority Data
May 15, 2008   (JP) .................................. 2008-128859

(51) Int. Cl.
*B01J 29/06*    (2006.01)

(52) U.S. Cl.
USPC ................... 502/73; 502/63; 502/64; 502/65; 502/66; 502/69; 502/74

(58) Field of Classification Search
USPC ........................ 502/63, 64, 65, 66, 69, 73, 74
See application file for complete search history.

(56) References Cited

U.S. PATENT DOCUMENTS
2008/0286184 A1* 11/2008 Ando et al. ................ 423/213.5

FOREIGN PATENT DOCUMENTS

| | | |
|---|---|---|
| EP | 1810750 | 7/2007 |
| EP | 1889651 | 2/2008 |
| JP | 63-123449 | 5/1988 |
| JP | 02-194819 | 8/1990 |
| JP | 3-270733 | 12/1991 |
| JP | 8-131828 | 5/1996 |
| JP | 2005-177570 | 7/2005 |
| JP | 2005-246341 | 9/2005 |
| JP | 2006-305423 | 11/2006 |
| JP | 2008-080195 | 4/2008 |
| JP | 2008-081348 | 4/2008 |
| WO | 2007138874 | 12/2007 |

OTHER PUBLICATIONS

International Search Report, PCT/JP2008/070172, Mar. 3, 2009.
Extended European Search Report dated Jul. 24, 2012, with English translation; Application No. 08874279.6.

* cited by examiner

*Primary Examiner* — Elizabeth Wood
(74) *Attorney, Agent, or Firm* — Young & Thompson

(57) ABSTRACT

A nitrogen-oxide-removing catalyst includes β zeolite bearing a rare earth metal oxide, and titanium dioxide bearing a rare earth metal oxide; includes β-zeolite bearing a rare earth metal oxide and iron oxide or iron hydroxide, and titanium dioxide bearing a rare earth metal oxide and iron oxide or iron hydroxide; or includes a carrier made of a ceramic or metallic material, and a layer of the nitrogen-oxide-removing catalyst supported on the carrier.

5 Claims, No Drawings

CATALYST FOR PURIFYING NITROGEN OXIDE

TECHNICAL FIELD

The present invention relates to a nitrogen-oxide-removing catalyst which selectively catalyzes reduction of nitrogen oxide, and more particularly, to a nitrogen-oxide-removing catalyst which selectively catalyzes reduction of nitrogen oxide contained in exhaust gas from diesel engines.

BACKGROUND ART

Hitherto, there have been developed a variety of nitrogen-oxide-removing catalysts which selectively catalyze reduction of nitrogen oxide with $NH_3$. For example, there have been proposed, as such nitrogen-oxide-removing catalysts, a catalyst containing β-zeolite in which metal element ions have been substituted by iron ions and lanthanum ions (see Patent Document 1), and a catalyst formed of zeolite in which metal elements have been substituted by Fe ions and rare earth metal element ions (see Patent Document 2).

However, these conventional catalysts lack sufficient activity for selective reduction of nitrogen oxide and sufficient catalyst durability.

[Patent Document 1] Japanese Patent Application Laid-Open (kokai) No. 2005-177570

[Patent Document 2] Japanese Patent Application Laid-Open (kokai) No. 2006-305423

DISCLOSURE OF THE INVENTION

Problems to be Solved by the Invention

An object of the present invention is to provide a catalyst for removing nitrogen oxide (hereinafter referred to as nitrogen-oxide-removing catalyst) which has high nitrogen-oxide-selective reduction activity and which exhibits small decrease in catalytic performance after employment under severe conditions.

Means for Solving the Problems

The present inventor has carried out extensive studies in order to attain the aforementioned object, and has found that a nitrogen-oxide-removing catalyst which has high nitrogen-oxide-selective reduction activity and which exhibits small decrease in catalytic performance after employment under severe conditions can be produced through employment in combination of β-zeolite bearing a rare earth metal oxide and titanium dioxide bearing a rare earth metal oxide. The inventor has also found that the durability of the catalyst is further enhanced by adding iron oxide or iron hydroxide to the catalyst. The present invention has been accomplished on the basis of these findings.

Accordingly, the nitrogen-oxide-removing catalyst of the present invention is characterized by comprising β-zeolite bearing a rare earth metal oxide, and titanium dioxide bearing a rare earth metal oxide.

The nitrogen-oxide-removing catalyst of the present invention is also characterized by comprising β-zeolite bearing a rare earth metal oxide and iron oxide or iron hydroxide, and titanium dioxide bearing a rare earth metal oxide and iron oxide or iron hydroxide.

The nitrogen-oxide-removing catalyst of the present invention is further characterized by comprising a carrier made of a ceramic or metallic material, and a layer of any of the aforementioned nitrogen-oxide-removing catalysts supported on the carrier.

Effects of the Invention

The nitrogen-oxide-removing catalyst of the present invention has high nitrogen-oxide-selective reduction activity and exhibits small decrease in catalytic performance after employment under severe conditions. The catalyst of the invention is particularly suitable for selective reduction of nitrogen oxide contained in diesel engine exhaust gas.

BEST MODES FOR CARRYING OUT THE INVENTION

The nitrogen-oxide-removing catalyst of the present invention employs, in combination, β-zeolite bearing a rare earth metal oxide and titanium dioxide bearing a rare earth metal oxide. Through addition of titanium dioxide bearing a rare earth metal oxide to a conventional catalyst formed of β-zeolite bearing a rare earth metal oxide, the resultant catalyst has high nitrogen-oxide-selective reduction activity and exhibits small decrease in catalytic performance after employment under severe conditions. However, at present, the reason why the effects can be attained has not been fully elucidated.

When β-zeolite bearing a rare earth metal oxide and iron oxide or iron hydroxide is used in combination with titanium dioxide bearing a rare earth metal oxide and iron oxide or iron hydroxide, the resultant catalyst has higher nitrogen-oxide-selective reduction activity and exhibits smaller decrease in catalytic performance after employment under severe conditions. That is, the catalyst has enhanced durability.

No particular limitation is imposed on the species of the rare earth metal oxide which may be incorporated into the nitrogen-oxide-removing catalyst of the present invention, and any rare earth metal oxide which is supported by zeolite in conventionally known nitrogen-oxide-removing catalysts may be used. Examples of the rare earth metal oxide include lanthanum oxide, cerium oxide, praseodymium oxide, neodymium oxide, samarium oxide, and gadolinium oxide.

In a typical embodiment, the nitrogen-oxide-removing catalyst product of the present invention is formed of a carrier made of a ceramic or metallic material, and, supported on the carrier, a layer of a nitrogen-oxide-removing catalyst including β-zeolite bearing a rare earth metal oxide and titanium dioxide bearing a rare earth metal oxide, or a layer of a nitrogen-oxide-removing catalyst including β-zeolite bearing a rare earth metal oxide and iron oxide or iron hydroxide and titanium dioxide bearing a rare earth metal oxide and iron oxide or iron hydroxide.

No particular limitation is imposed on the shape of the carrier made of a ceramic or metallic material employed in the present invention. However, the carrier is generally in the form of, for example, honeycomb, plate, or pellet, and is preferably in a honeycomb form. Examples of the material of the carrier include ceramic materials such as alumina ($Al_2O_3$), mullite ($3Al_2O_3 \cdot 2SiO_2$), and cordierite ($2MgO \cdot 2Al_2O_3 \cdot 5SiO_2$); and metallic materials such as stainless steel. Among these materials, cordierite is particularly useful, by virtue of having a considerably low thermal expansion coefficient of $1.0 \times 10^{-6}/°C$.

In the nitrogen-oxide-removing catalyst product which is formed of a carrier made of a ceramic or metallic material, and, supported on the carrier, a layer of a nitrogen-oxide-removing catalyst including β-zeolite bearing a rare earth metal oxide and titanium dioxide bearing a rare earth metal oxide, preferably, the amount of β-zeolite supported by the carrier is 60 to 300 g/L; the amount of titanium dioxide supported by the carrier is 1 to 100 g/L, and the amount of the rare earth metal oxide supported by the carrier is 1 to 100 g/L. When the amount of each component is less than the corresponding lower limit, the target effects of the present invention are lessened, whereas when the amount of each component is more than the corresponding upper limit, generally, effects commensurate with the increased amount cannot be attained, and the catalyst product is difficult to produce due to poor applicability of a catalyst layer onto the carrier.

In the nitrogen-oxide-removing catalyst product which is formed of a carrier made of a ceramic or metallic material, and, supported on the carrier, a layer of a nitrogen-oxide-removing catalyst including β-zeolite bearing a rare earth metal oxide and iron oxide or iron hydroxide, and titanium dioxide bearing a rare earth metal oxide and iron oxide or iron hydroxide, preferably, the amount of β-zeolite supported by the carrier is 60 to 300 g/L; the amount of titanium dioxide supported by the carrier is 1 to 100 g/L; the amount of the rare earth metal oxide supported by the carrier is 1 to 100 g/L; and the amount of iron oxide or iron hydroxide supported by the carrier (as reduced to the amount of iron element) is 1 to 50 g/L. When the amount of each component is less than the corresponding lower limit, the target effects of the present invention are reduced, whereas when the amount of each component is more than the corresponding upper limit, the effects commensurate the increased amount cannot be attained, and the catalyst product is difficult to produce due to poor applicability of a catalyst layer onto the carrier.

In the production of the nitrogen-oxide-removing catalyst of the present invention, a β-zeolite material having a mole ratio $SiO_2/Al_2O_3$ of 10 to 2000/1 is preferably used. For forming titanium dioxide, a compound which forms titanium dioxide through firing; e.g., titanium dioxide sol, titanium chloride, titanium sulfate, titanium tetraisopropoxide, or titanium dioxide per se, may be used as a source material.

For forming the rare earth metal oxide, a compound which forms a rare earth metal oxide through firing; e.g., a rare earth metal nitrate, a rare earth metal acetate, a rare earth metal carbonate, a rare earth metal sulfate, or a rare earth metal phosphate, may be used as a source material. For forming iron oxide or iron hydroxide, a compound which forms iron oxide or iron hydroxide through firing; e.g., iron nitrate, iron chloride, iron acetate, iron hydroxide, iron oxalate, iron sulfate, or iron phosphate, may be used as a source material. In the present invention, the term "iron oxide or iron hydroxide" includes $Fe_2O_3$, FeOOH, $Fe_3O_4$, FeO, etc., which are formed depending on the firing conditions.

The nitrogen-oxide-removing catalyst of the present invention may be produced through a variety of methods. In one exemplary method, an aqueous slurry containing β-zeolite, a compound which forms titanium dioxide through firing, and a binder is applied onto a carrier, dried, and fired. The fired product is immersed in an aqueous solution containing a compound which forms a rare earth metal oxide or in an aqueous solution containing a compound which forms a rare earth metal oxide and a compound which forms iron oxide or iron hydroxide and is removed from the solution, followed by drying and firing, to thereby prepare a catalyst. In an alternative method, an aqueous slurry containing β-zeolite, a compound which forms titanium dioxide through firing, a compound which forms a rare earth metal oxide through firing, and a binder; or an aqueous slurry containing β-zeolite, a compound which forms titanium dioxide through firing, a compound which forms a rare earth metal oxide through firing, a compound which forms iron oxide or iron hydroxide through firing, and a binder is applied onto a carrier, dried, and fired, to thereby prepare a catalyst. In a still alternative method, an aqueous slurry containing β-zeolite, a compound which forms titanium dioxide through firing, a compound which forms a rare earth metal oxide through firing, and a binder is applied onto a carrier, dried, and fired. The fired product is immersed in an aqueous solution containing a compound which forms iron oxide or iron hydroxide through firing and removed from the solution, followed by drying and firing, to thereby prepare a catalyst.

The nitrogen-oxide-removing catalyst of the present invention is employed in selective reduction of nitrogen oxide in the presence of $NH_3$ for removing nitrogen oxide. Therefore, $NH_3$ must be supplied to a discharge gas to be cleaned. No particular limitation is imposed on the method for supplying $NH_3$, and there may be employed a known method such as directly supplying $NH_3$ gas, adding aqueous ammonia, or addition of a compound which forms $NH_3$ through decomposition thereof (e.g., urea or hexamethylenetetramine).

The present invention will next be described in detail by way of Examples, Comparative Example, and Test Examples.

Example 1

β-Zeolite (100 parts by mass), $TiO_2$ sol ($TiO_2$ concentration: 30 mass %) (67 parts by mass), an $SiO_2$-based binder ($SiO_2$ concentration: 50 mass %) (100 parts by mass), and pure water (200 parts by mass) were mixed by means of a ball mill, to thereby form a slurry. The slurry was applied to a cordierite carrier for evaluating model gas (φ: 25.4 mm, L: 20 mm, 400 cells) so that the amount of β-zeolite supported by the carrier was adjusted to 100 g/L, and the amount of $TiO_2$ supported by the carrier was adjusted to 20 g/L. The coated carrier was dried and fired at 500° C. Subsequently, the thus-treated carrier was impregnated with an aqueous solution formed of cerium nitrate, iron nitrate, and pure water. The thus-treated carrier was removed from the aqueous solution, dried, and fired at 500° C., to thereby yield a nitrogen-oxide-removing catalyst. The amount of $CeO_2$ supported by the carrier was adjusted to 20 g/L, and the amount of Fe supported by the carrier was adjusted to 10 g/L.

Example 2

The procedure of Example 1 was repeated, except that an aqueous solution formed of cerium nitrate and pure water was used instead of the aqueous solution formed of cerium nitrate, iron nitrate, and pure water, to thereby yield a nitrogen-oxide-removing catalyst. The amount of β-zeolite supported by the carrier was adjusted to 100 g/L, the amount of $TiO_2$ supported by the carrier was adjusted to 20 g/L, and the amount of $CeO_2$ supported by the carrier was adjusted to 20 g/L.

Comparative Example 1

β-Zeolite (100 parts by mass), an $SiO_2$-based binder ($SiO_2$ concentration: 50 mass %) (100 parts by mass), and pure water (200 parts by mass) were mixed by means of a ball mill, to thereby form a slurry. The slurry was applied to a cordierite carrier for evaluating model gas (φ: 25.4 mm, L: 20 mm, 400 cells) so that the amount of β-zeolite supported by the carrier was adjusted to 100 g/L. The coated carrier was dried and fired at 500° C. Subsequently, the thus-treated carrier was impregnated with an aqueous solution formed of iron nitrate and pure water. The thus-treated carrier was removed from the aqueous solution, dried, and fired at 500° C., to thereby yield a nitrogen-oxide-removing catalyst. The amount of Fe supported by the carrier was adjusted to 10 g/L.

<Exhaust Gas Cleaning Performance Test>

Each of the nitrogen-oxide-removing catalysts produced in Examples 1 and 2 and Comparative Example 1 was charged in an evaluation apparatus. While a model exhaust gas having a composition shown in Table 1 was caused to flow through the apparatus at a space hourly velocity of 50,000/h, the catalyst was heated at 20° C./min to 400° C., whereby percent removal of NO was determined. The percent cleaning of the model gas (%) at 400° C. is shown in Table 2.

TABLE 1

| Model exhaust gas | | | | |
|---|---|---|---|---|
| NO | $NH_3$ | $O_2$ | $H_2O$ | $N_2$ |
| 200 ppm | 200 ppm | 10% | 5% | Balance |

TABLE 2

| Model gas evaluation test results | |
|---|---|
| | Percent NO removal at 400° C. |
| Nitrogen-oxide-removing catalyst of Ex. 1 | 97.7% |
| Nitrogen-oxide-removing catalyst of Ex. 2 | 97.9% |
| Nitrogen-oxide-removing catalyst of Comp. Ex. 1 | 83.8% |

Example 3

β Zeolite (100 parts by mass), $TiO_2$ sol ($TiO_2$ concentration: 30 mass %) (67 parts by mass), cerium nitrate (50 parts by mass), an $SiO_2$-based binder ($SiO_2$ concentration: 50 mass %) (100 parts by mass), and pure water (200 parts by mass) were mixed by means of a ball mill, to thereby form a slurry. The slurry was applied to a cordierite carrier for evaluating model gas (φ: 25.4 mm, L: 20 mm, 400 cells) so that the amount of β-zeolite supported by the carrier was adjusted to 100 g/L, the amount of $TiO_2$ supported by the carrier was adjusted to 20 g/L, and the amount of $CeO_2$ supported by the carrier was adjusted to 20 g/L. The coated carrier was dried and fired at 500° C. Subsequently, the thus-treated carrier was impregnated with an aqueous solution formed of iron nitrate and pure water. The thus-treated carrier was removed from the aqueous solution, dried, and fired at 500° C., to thereby yield a nitrogen-oxide-removing catalyst. The amount of Fe supported by the carrier was adjusted to 10 g/L.

Example 4

β Zeolite (100 parts by mass), $TiO_2$ sol ($TiO_2$ concentration: 30 mass %) (67 parts by mass), cerium nitrate (50 parts by mass), iron nitrate (72 parts by mass), an $SiO_2$-based binder ($SiO_2$ concentration: 50 mass %) (100 parts by mass), and pure water (200 parts by mass) were mixed by means of a ball mill, to thereby form a slurry. The slurry was applied to a cordierite carrier for evaluating model gas (φ: 25.4 mm, L: 20 mm, 400 cells) so that the amount of β-zeolite supported by the carrier was adjusted to 100 g/L, the amount of $TiO_2$ supported by the carrier was adjusted to 20 g/L, the amount of $CeO_2$ supported by the carrier was adjusted to 20 g/L, and the amount of Fe supported by the carrier was adjusted to 10 g/L.

The coated carrier was dried and fired at 500° C., to thereby yield a nitrogen-oxide-removing catalyst.

Comparative Example 2

β-Zeolite was added to aqueous iron nitrate solution, and the mixture was evaporated to dryness, to thereby form β zeolite bearing 9 mass % Fe (powder A). Separately, $TiO_2$ sol was added to aqueous ammonia solution, and cerium nitrate was added to the mixture. The resultant mixture was filtered, dried, and fired at 500° C., to thereby produce $CeO_2$—$TiO_2$ complex oxide (powder B). The ration by mass of $CeO_2$ and $TiO_2$ was adjusted to 1:1. Powder A, powder B, an $SiO_2$-based binder, and pure water were mixed by means of a ball mill, to thereby form a slurry. The slurry was applied to a cordierite carrier for evaluating model gas (φ: 25.4 mm, L: 20 mm, 400 cells) so that the amount of β zeolite supported by the carrier was adjusted to 100 g/L, the amount of $TiO_2$ supported by the carrier was adjusted to 20 g/L, the amount of $CeO_2$ supported by the carrier was adjusted to 20 g/L, and the amount of Fe supported by the carrier was adjusted to 10 g/L. The coated carrier was dried and fired at 500° C., to thereby yield a nitrogen-oxide-removing catalyst.

<Exhaust Gas Cleaning Performance Test>

Each of the nitrogen-oxide-removing catalysts produced in Examples 3 and 4 and Comparative Example 2 was charged in an evaluation apparatus. While the model exhaust gas having a composition shown in Table 1 was caused to flow through the apparatus at a space hourly velocity of 50,000/h, the catalyst was heated at 20° C./min to 400° C., whereby percent removal of NO was determined. The percent cleaning of the model gas (%) at 400° C. is shown in Table 3.

Separately, in order to evaluate durability of the catalysts, each of the nitrogen-oxide-removing catalysts produced in Examples 3 and 4 and Comparative Example 2 was treated in an nitrogen atmosphere containing 10 mass % oxygen and 10 mass % water at 750° C. for 20 hours and then placed in a catalyst evaluation apparatus. Subsequently, while the model exhaust gas having a composition shown in Table 1 was caused to flow through the apparatus at a space hourly velocity of 50,000/h, the catalyst was heated at 20° C./min to 400° C., whereby percent removal of NO was determined. The percent cleaning of the model gas (%) at 400° C. is shown in Table 3.

TABLE 3

| Model gas evaluation results | | |
|---|---|---|
| | Percent NO removal at 400° C. | |
| | Before durability test | After durability test |
| Nitrogen-oxide-removing catalyst of Ex. 3 | 99.1% | 82.0% |
| Nitrogen-oxide-removing catalyst of Ex. 4 | 98.8% | 63.8% |
| Nitrogen-oxide-removing catalyst of Comp. Ex. 2 | 98.3% | 45.6% |

The invention claimed is:
1. A nitrogen-oxide-removing catalyst product, comprising:
a carrier made of a ceramic or metallic material, and
a layer of a nitrogen-oxide-removing catalyst supported on the carrier, wherein said nitrogen-oxide-removing catalyst comprises:
β-zeolite bearing a rare earth metal oxide and iron oxide or iron hydroxide, and
titanium dioxide bearing a rare earth metal oxide and iron oxide or iron hydroxide; and
the amount of β-zeolite supported by the carrier is 60 to 300 g/L,
the amount of titanium dioxide supported by the carrier is 1 to 100 g/L,
the amount of the rare earth metal oxide supported by the carrier is 1 to 100 g/L, and
the amount of iron oxide or iron hydroxide supported by the carrier, as reduced to the amount of iron element, is 1 to 50 g/L.

2. The catalyst product according to claim 1, wherein the rare earth metal oxide is selected from the group consisting of: lanthanum oxide, cerium oxide, praseodymium oxide, neodymium oxide, samarium oxide and gadolinium oxide.

3. The catalyst product according to claim 1, wherein the carrier comprises alumina ($Al_2O_3$), mullite ($3Al_2O_3$-$2SiO_2$), or cordierite ($2MgO$-$2Al_2O_3$-$5SiO_2$).

4. The catalyst product according to claim 1, comprising β-zeolite having a mole ratio $SiO_2/Al_2O_3$ of 10-2000/1.

5. The catalyst product according to claim 1, wherein:
the amount of β-zeolite supported by the carrier is 100 to 300 g/L,
the amount of titanium dioxide supported by the carrier is 20 to 100 g/L,
the amount of the rare earth metal oxide supported by the carrier is 20 to 100 g/L, and
the amount of iron oxide or iron hydroxide supported by the carrier, as reduced to the amount of iron element, is 10 to 50 g/L.

* * * * *